United States Patent
Pietsch

(10) Patent No.: US 9,573,296 B2
(45) Date of Patent: Feb. 21, 2017

(54) METHOD FOR SIMULTANEOUSLY CUTTING A MULTIPLICITY OF SLICES OF PARTICULARLY UNIFORM THICKNESS FROM A WORKPIECE

(71) Applicant: Siltronic AG, Munich (DE)

(72) Inventor: Georg Pietsch, Burghausen (DE)

(73) Assignee: SILTRONIC AG, Munich (DE)

( * ) Notice: Subject to any disclaimer, the term of this patent is extended or adjusted under 35 U.S.C. 154(b) by 10 days.

(21) Appl. No.: 14/691,646

(22) Filed: Apr. 21, 2015

(65) Prior Publication Data
US 2015/0314484 A1   Nov. 5, 2015

(30) Foreign Application Priority Data

Apr. 30, 2014   (DE) .................. 10 2014 208 187

(51) Int. Cl.
   *B24D 5/00*   (2006.01)
   *B28D 5/04*   (2006.01)
   *B24B 27/06*   (2006.01)
   *B23D 57/00*   (2006.01)

(52) U.S. Cl.
   CPC ......... *B28D 5/045* (2013.01); *B23D 57/0023* (2013.01); *B23D 57/0053* (2013.01); *B24B 27/0633* (2013.01)

(58) Field of Classification Search
   CPC ........................... B28D 5/045; B24B 27/0633
   USPC ................................ 125/16.02, 21; 451/168
   See application file for complete search history.

(56) References Cited

U.S. PATENT DOCUMENTS 5,937,844 A  *  8/1999  Kiuchi ................. B28D 5/0064
                                             125/16.02
6,109,253 A  *  8/2000  Ikehara .............. B23D 57/0053
                                                125/12
6,422,067 B1 *  7/2002  Oishi ..................... B28D 1/025
                                                125/21

(Continued)

FOREIGN PATENT DOCUMENTS

DE      112008003339 T5   12/2010
EP           0798091 A2   10/1997

(Continued)

OTHER PUBLICATIONS

F.W. Preston, et al. Journal of the Society of Glass Technology, 11 (1927), pp. 214-256.

*Primary Examiner* — Robert Rose
(74) *Attorney, Agent, or Firm* — Leydig, Voit & Mayer, Ltd.

(57) ABSTRACT

A method for simultaneously cutting a multiplicity of slices from a cylindrical workpiece, along strictly convex cutting faces, by supplying a suspension of hard substances in a carrier liquid, as cutting medium, to wire portions, while the wire portions, having a longitudinal tension, define a relative motion to the workpiece as a result of wire guide roller rotation with continual alternation between a first direction of rotation and a second direction of rotation, which is opposite to the first direction of rotation, wherein, during the rotation in the first direction, the wire is moved a first length, and during the rotation in the second direction, the wire is moved a second length, and the second length is shorter than the first, and at the cutting operation start a first longitudinal wire tension is greater than a second longitudinal tension at the end.

29 Claims, 4 Drawing Sheets

(56) References Cited

U.S. PATENT DOCUMENTS

| | | | |
|---|---|---|---|
| 6,443,143 B1* | 9/2002 | Ishida | B03C 1/00 |
| | | | 125/16.02 |
| 8,146,581 B2 | 4/2012 | Kitagawa et al. | |
| 9,174,361 B2* | 11/2015 | Blank | B28D 5/045 |
| 2010/0258103 A1 | 10/2010 | Kitagawa | |
| 2012/0298090 A1* | 11/2012 | Ohya | B23D 57/0069 |
| | | | 125/16.02 |
| 2014/0216222 A1 | 8/2014 | Itoi | |

FOREIGN PATENT DOCUMENTS

| | | |
|---|---|---|
| EP | 1287958 A1 | 3/2003 |
| EP | 1827745 B2 | 9/2011 |
| GB | 2476658 A | 7/2011 |
| JP | 1193165 A | 8/1989 |
| JP | 10166256 A | 6/1998 |
| JP | 2001232550 A | 8/2001 |
| JP | 2004243492 A | 9/2004 |
| JP | 2008023644 A | 2/2008 |
| JP | 2012121101 A | 6/2012 |
| JP | 2013111674 A | 6/2013 |
| WO | WO 2013051183 A1 | 4/2013 |

\* cited by examiner

METHOD FOR SIMULTANEOUSLY CUTTING A MULTIPLICITY OF SLICES OF PARTICULARLY UNIFORM THICKNESS FROM A WORKPIECE

CROSS-REFERENCE TO RELATED APPLICATIONS

Priority is claimed to German Patent Application No. DE 10 2014 208 187.4, filed on Apr. 30, 2014, the entire disclosure of which is hereby incorporated by reference herein.

FIELD

The present invention relates to a method for cutting a multiplicity of slices from a workpiece, in particular semiconductor slices from a crystal, optionally using wire-assisted cut-off lapping.

BACKGROUND

Many applications require thin, flat slices of particular materials, for example glass slices as a substrate for the production of magnetic storage disks, slices of sapphire or silicon carbide as a base for the manufacture of optoelectronic components, or semiconductor slices for the production of photovoltaic cells ("solar cells") or as a substrate for the structuring of microelectronic or micro-electromechanical elements.

Semiconductor slices are slices of semiconductor materials such as, for example, element semiconductors (silicon, germanium), compound semiconductors (for example, aluminum or gallium) or compounds thereof (for example, $Si_{1-x}Ge_x$, $0<x<1$; AlGaAs, AlGaInP etc.).

The starting material is usually in the form of a rod of monocrystalline (electronics applications) or polycrystalline (solar cells) semiconductor material, and the required slices of this material are cut off from the rod by a chip-removing process such as cut-off lapping. A particle removed from the workpiece is referred to as a chip.

In particular, for cutting off semiconductor slices, cut-off lapping and cut-off grinding are especially important. In the case of cut-off lapping, the tools for removing material are in the form of sharp-edged particles of a hard substance, for example silicon carbide, as a suspension in a viscous carrier liquid, and a tool carrier in the form of a wire, on which the carrier liquid and hard substances adhere, brings these particles into contact with the workpiece. The carrier liquids include, for example, water, polyols, mineral oils, glycols, or mixtures thereof. The suspension of hard substance is referred to as slurry. As a result of motion the wire in the longitudinal direction of the wire, exertion of a force in the transverse direction of the wire and supply of slurry, hard substances enter between the surface of the wire and that of the workpiece, are moved under pressure relative to the latter by means of a sliding or rolling motion, and remove chips from the workpiece by means of material overloading or fatigue, by brittle erosion.

It is characteristic of cut-off lapping that the slurry contains hard substances that effect removal of material, and the tool carrier does not contain any hard substances that effect removal of material, and the removal of material is based on an interaction of three bodies (firstly, the workpiece; secondly, the hard substance; thirdly, the tool carrier).

In the case of cut-off grinding, the tools that remove material are in the form of sharp-edge particles of hard substances that are fixedly bonded to a surface of a tool carrier. The tool carrier is, for example, a wire.

It is characteristic of cut-off grinding that the tool carrier contains fixedly bonded hard substances that effect removal of material, and the cooling lubricant does not contain any hard substances that effect removal of material, and the removal of material is based on an interaction of two bodies (firstly, the workpiece; secondly, hard substances fixedly bonded to the tool carrier).

The process of cut-off lapping and cut-off grinding by means of a wire is referred to by the combined term, wire sawing.

In the case of cut-off lapping and cut-off grinding, the hard substances used include, for example, silicon carbide, boron carbide, boron nitride, silicon nitride, zirconium oxide, silicon dioxide, aluminum oxide, chromium oxide, titanium nitride, tungsten carbide, titanium carbide, vanadium carbide, diamond, sapphire, and mixtures thereof. Silicon carbide is particularly important in the case of cut-off lapping, and diamond in the case of cut-off grinding.

The wire, as tool carrier, may be monofilar, or may be a stranded wire composed of a plurality of strands or fibers, and also of differing materials, and may possibly carry additional coatings of metals, alloys or plastics.

In the case of cut-off lapping and cut-off grinding, the wires are composed, for example, of hardened steel ("piano wire"), plastics, carbon fibers or metal alloys.

Both cut-off lapping and cut-off grinding may be performed with one or more wires. Examples of the latter are so-called gang saws, in which the multiplicity of individual wires are fastened in a frame (gang), which is then moved back and forth in the longitudinal direction of the wire, such that the wires work through the workpiece.

In the cutting of slices from a rod of semiconductor material, wire saws that have just one wire are of particular importance.

Rods of semiconductor material for electronics application are usually processed before the cutting operation, such that they are in the shape of a straight, circular cylinder, having a rod axis, a cylindrical circumferential surface and two cylinder end faces (bottom and top face). Usually, an identification groove (notch), which marks, for example, a particular crystal orientation, is also ground into the circumferential surface of the rod, parallel to the cylinder axis. The semiconductor slices obtained by the cutting operation are also referred to as "wafers," and they themselves, in turn, are in the shape of a straight, circular cylinder, the height of the cylinder being some tenths of a millimeter up to, for instance, one millimeter, and the base of the cylinder having a diameter of 75 to 450 mm. Rods or wafers having a diameter of up to 150 mm are classed as small, those up to 200 mm as medium-sized, those up to 300 mm as large, and those up to 450 mm as very large.

Dividing up into slices, by means of cut-off lapping or cut-off grinding, is effected along a multiplicity of kerfs, which are as flat as possible and as parallel to each other as possible, and which are substantially perpendicular to the rod axis, i.e. with a deviation of up to 2° relative to the perpendicular to the rod axis.

Cut-off lapping and cut-off grinding are equally suitable for dividing up small and medium semiconductor rods. For dividing up large and very large semiconductor rods, cut-off lapping is particularly important, since, even in the case of long lengths of wire in contact with the rod, it produces wafers whose front and back have a high degree of flatness and parallelism in relation to each other. In addition, the cutting faces that then form the front and back of the cut-off slices have only a small depth of crystalline damage caused by the cutting operation.

Owing to the shallowness of the damage, wafers obtained by cut-off lapping are less susceptible to breakage, and during the subsequent processing only a small amount of material then has to be removed in order ultimately to obtain a wafer having the required high degree of plane parallelism of the front and back, and lack of defects. Cut-off lapping therefore enables particularly high-quality wafers to be produced in a particularly cost-effective manner.

The length along which a wire portion extends through the workpiece at any moment in the cutting operation, and on which the wire portion thus acts to remove material, is referred to as the engagement length of the wire portion.

In the following "multiwire cut-off lapping" ([slurry] multiwire slicing, MWS, S-MWS) is described in greater detail using the references from FIG. 1.

In cut-off lapping, the wire 1 is wound helically around at least two cylindrical wire guide rollers 3 and 4, which have cylinder axes 5 and 6 that are parallel to each other, such that, on at least one side of this arrangement, a multiplicity of portions 11 of the wire come to lie (25) parallel to each other in one plane, perpendicularly in relation to the cylinder axes, and when the wire guide rollers are rotated 7 and 8 in the same direction, about their respective axes, the wire portions 11 move with a uniform velocity and parallel to each other in the longitudinal direction of the wire. The term wire grid—or sawing grid—is used to refer to this at least one side of wire portions running parallel to each other. The position of the wire grid in this case is selected such that it faces toward the rod to be cut.

The wire guide rollers in this case are normally each provided with a multiplicity of closed grooves 2, which are parallel to each other and perpendicular in relation to the cylinder axis, and which are in flush alignment in respect of adjacent guide rollers, and in which the individual turns of the wire are guided.

Removal of material is effected by moving the wire portions in the longitudinal direction of the wire, supplying the suspension, comprising the hard substances, to the wire grid, and advancing the workpiece on to and through the wire grid.

In the run-in to and run-out from the wire grid, the longitudinal wire tension in the running direction of the wire is controlled by means of deflection rollers, which are attached to levers, an alteration of the angle of the levers in relation to the longitudinal direction of the wire causing the running length of the wire to be changed, and thus enabling the wire to be tensioned to a greater or lesser degree.

The torque exerted upon the lever by the wire provides a measure of the actual wire tension, such that, by means of torque measurement and angle adjustment, there is a closed loop for feedback control of the longitudinal wire tension. Levers having a deflection roller are referred to as "dancers" because of their rapid back and forth motion as control deviations occur.

During the cut, the wire is subject to wear resulting from abrasion. The wire cross section decreases approximately in proportion to the product from the cumulative length of the wire contact with the workpiece 15 and the workpiece volume machined per kerf. Consequently, the width of the kerfs 13 decreases from the first end face 12 of the rod, at which the wire first enters a first kerf, to the opposite, second end face 24 of the rod, at which the wire ultimately emerges from the last kerf.

The first end face is also referred to as the wire infeed side 12 of the rod, and the second end face 24 as the wire run-out side.

The decrease in thickness of the wire is generally compensated by a gradual decrease in the distance between adjacent grooves of the wire guide rollers 3 and 4 from the wire infeed side 12 to the wire run-out side 24 of the rod, such that, averaged over the full length of the rod, the wafers cut off from the rod are of a constant thickness.

During the cutting operation, the wire may be wound continuously in one direction from a pay-off coil (delivery coil), via the wire guide rollers and the grid, to a take-up coil (receiver coil), such that the wire portions move in one direction throughout the entire cutting operation. This is referred to as unidirectional sawing.

The wire may also be guided through the workpiece with a change of direction. Such a bidirectional cut may be effected over the entire run of the wire supply from the pay-off coil, via the grid and workpiece, to the take-up coil, and then in full from the original take-up coil, which thus becomes the pay-off coil, back to the original pay-off coil, which now becomes the take-up coil. Owing to the wear on the wire, however, the workpieces would become thicker on the "return pass" than on the "outgoing pass," which is undesirable.

For the production of large and very large wafers for particularly demanding applications, particular importance attaches to cut-off lapping with multiple and continuous reversal of the direction of the wire run, according to the so-called pilgrim step method ("pilgrim step motion," "wire reciprocation").

A pilgrim step in this case refers to a pair of successive reversals of the wire direction. A pilgrim step comprises a first motion of the wire in a first longitudinal direction of the wire, by a first length, and then a second motion of the wire in a second direction, exactly opposite to the first direction, by a second length, the second length being selected so as to be less than the first length.

For each pilgrim step, therefore, a wire length corresponding to the sum of the two lengths goes through the workpiece, while the wire portion coming into cutting engagement with the workpiece in this case advances from the pay-off coil to the take-up coil only by an amount corresponding to the difference of the two lengths. In the case of the pilgrim step method, therefore, the wire is used multiple times, by the factor resulting from the ratio of the sum to the difference of the two lengths. For simplicity, the difference of the two lengths is to be referred to as the "net motion" of the wire over a complete pilgrim step, having a net wire infeed 9 and a net wire run-out 10 (FIG. 1).

By analogy with the terms used for a rod cut by a unidirectional wire motion, in the case of a rod cut with a pilgrim step method the first end face of the rod, at which the wire first enters the first kerf, in the direction of its net motion, is referred to as the wire infeed side of the rod, and the opposite, second end face, at which the wire ultimately emerges from the final kerf, in the direction of its net motion, is referred to as the wire run-out side of the rod.

Since the length of the forward and return motion, and therefore the effective length and wear of the wire, are freely selectable, the pilgrim step method is highly suitable for cutting workpieces into a smaller number of slices, of comparatively shorter workpieces, which could not be cut with an economic use of wire by means of only a single wire pass (unidirectional cut). The pilgrim step method is particularly suitable for cutting workpieces that have wire engagement lengths that vary over the course of the cut, i.e. for example cylindrical semiconductor rods.

For the purpose of cutting wafers from a semiconductor rod, the rod is first mounted, depending on its total length, with a part of its circumferential surface on a holding, mounting or sawing strip, for example a strip made of hard carbon, glass, plastic or a composite material. This sawing strip is shaped, on the side thereof that faces away from the rod, or is connected to a further adapter, such that the sawing strip or adapter can be clamped in a corresponding receiving device, which is fixed to the feed table that, during the cutting operation, feeds the bar perpendicularly on to the grid and through the latter. The bond between the rod and the sawing strip is produced by adhesion, and that between the sawing strip and the adapter is produced by adhesion, positive fit by force or positive fit by shape (for example, clamping or screwed connection). The rod axis is aligned substantially perpendicularly in relation to the feed direction, and perpendicularly in relation to the direction of the wires in the grid, and thus substantially in the plane spanned by the wire portions of the grid.

The feed table is usually disposed above the wire grid, and feeds the clamped-in rod perpendicularly on to the plane spanned by the wire portions of the grid.

The following continues with reference to FIG. 1. The side of the cylinder surface of the rod, into which the wire portions of the grid enter, along their longitudinal direction, into the kerfs, is referred to as the (momentary) wire entry side 17, and the side on which they re-emerge from the kerfs, along their longitudinal direction, is referred to as the (momentary) wire exit side 18. Disposed above the wire grid 25 on the wire entry side, parallel to the rod axis 14, is a nozzle strip 19, having slurry nozzles 21, which extends over the entire length of the wire grid and uniformly applies slurry 22 to the wire portions 11 before they enter the rod.

In the case of a unidirectional cut, with only one wire entry side, one nozzle strip is provided for this purpose, and in the case of a bidirectional cut, with wire entry and exit sides alternating in time, two nozzle strips 22 and 23 are provided, one on each side of the rod. The two nozzle strips 19 and 20 may be operated alternately, such that the strip on the instantaneous wire entry side is active in each case, or, for simplicity, both may also be operated continuously.

As a result of the rod being fed on to the grid, the entire length of the rod is brought into contact with the grid, along a line on the cylinder surface of the rod that is parallel to the rod axis. This instant of first contact of the wire portions with the rod is referred to as the cut-in operation or, in short, cut-in. Upon further feeding, motion of the wire portions of the grid in the longitudinal direction of the wire, and supply of slurry, the wire portions work slowly through the rod, removing material.

The cut terminates as soon as all wire portions of the grid have swept over the entire cross section of the rod and have fully reached the sawing strip. The instant of final contact of the wire portions with the rod is referred to as the out-cut operation, or, in short, out-cut. In the example shown in FIG. 1, the cut is being effected to the side having the identification groove 26, from the opposite side of the rod. The mounting strip holding the rod is bonded to the latter on the side with the identification groove 26 (not shown).

The feeding of the rod is ended, and the rod is again slowly withdrawn from the grid. As the rod is being withdrawn, the wire continues to travel in its longitudinal direction, at least slowly, in order to prevent the wire portions from becoming caught on any irregularities of the previously produced cut faces.

After the rod has been withdrawn from the wire grid, the composite consisting of sawn-up rod, sawing and mounting strip is removed from the clamping device on the feed table. Thus, after completion of the cut, a multiplicity of wafers hang, like teeth on a comb, on the partially cut-in sawing strip, with a portion of their circumferential surface still joined to the sawing strip. The wafers are separated by dissolving the adhesive bond. The bond can be dissolved, for example, if an adhesive has been used that can be dissolved by water or heat, the composite consisting of wafers, sawing and mounting strip being immersed in a hot water-bath for the purpose of so-called degluing.

Slurry cut-off lapping, and a suitable apparatus therefor, for cutting off semiconductor slices are described, for example, in EP 0 798 091 A2.

The width of the kerf produced, and consequently the thickness of the wafers obtained by the cutting operation, depends on the thickness of the wire, the thickness of the slurry film surrounding the wire in the kerf, and the spacing of the grooves in the wire guide rollers that guide the wire. Since the thickness of the wire changes continuously because of wear, and the thickness of the slurry film changes continuously as a result of being wiped off or becoming spent during the cutting operation, cut-off lapping is subject to certain limitations in respect of the degree to which the desired shape of the wafers obtained thereby can accurately be achieved. These limitations are described in the following.

As a wire portion enters the workpiece, most of the adhering slurry is stripped off. Of the slurry that does enter the kerf, most continues to be stripped off or become spent as the wire penetrates further into the rod. Wear causes the particles to become spent primarily because the hard materials become broken or fragmented, or because rounding or chipping off causes them to lose their sharp-edged cutting surfaces that remove material. The decrease in thickness of the slurry film surrounding the sawing wire, as viewed in the direction of entry of the wire, is also referred to as the "slurry funnel". Owing to the slurry funnel, each kerf is wide at the periphery of the workpiece, on the side on which the wire enters, and tapers in a wedge or funnel shape in the running direction of the wire, along the wire engagement length, to the opposite, wire exit side.

In the case of a unidirectional cut and large or very large semiconductor rods, in particular in the region of the longest wire engagement length—thus, in the case of a circular cylindrical rod, when the latter has been cut through by exactly half—virtually no more slurry reaches the wire exit side of the rod. Slices are produced having a thickness that increases in a wedge shape from the wire entry side to the wire exit side, with a high degree of roughness on the wire exit side ("sawing scores," "saw marks"). Semiconductor slices that have a tapering thickness and a high degree of roughness are not suitable for demanding applications. Unidirectional cut-off lapping therefore cannot be used for producing high-quality large or very large wafers.

In the case of the pilgrim step method, the direction of the longitudinal motion of the wire is reversed continuously. As a result, "slurry funnels" are produced alternately on the left and right in each kerf. If the infeed of the rod is effected so slowly, or the change in direction of the longitudinal motion of the wire is effected so rapidly, that the slurry funnels formed consecutively in alternating fashion overlap somewhat every second change of direction (=one complete pilgrim step)—as viewed in the direction of advance of the rod—the kerf is effectively supplied with slurry on both sides, and the slurry then only has to be transported as far as the center of the rod in each case. The overlapping also reduces the widening of the kerfs on the wire entry side that is caused by the slurry funnel in each case, and thereby reduces tapering of the wafers. The wafers obtained are then no longer wedge-shaped, but still have a slight saddle shape, with thicknesses that decrease slightly from the center to their peripheries, in both running directions of the wire. The minimum thickness occurs in the peripheral region of greatest wire engagement length, i.e. when a circular cylindrical has been cut through exactly by half. The zones of minimum thickness in the peripheral region of greatest wire engagement length are denoted by 27 and 29 in FIG. 2. Owing to the net motion of the wire in the case of cut-off lapping according to the pilgrim step method, and the decrease in thickness that the wire undergoes in this process, the taper 27 of the wafer on the wire entry side is somewhat thicker than the taper 29 on the wire exit side; however, both are considerably less than the wedge shape of a comparative cut with a unidirectional wire motion.

This saddle shape can be rendered less pronounced by methods known in the prior art, for example by adjusting the first and second wire motion lengths of the pilgrim steps according to the actual depth of cut (depth of the kerf in the direction of the ingot feed), or by increasing the wire application in the region in which the saddle shape is most pronounced. In particular, for example, the rod feed rate can be reduced to such an extent that the slurry funnels of two wire reversals overlap almost completely. There are economic efficiency limits to the measures for reducing the saddle shape, since they result in very long overall cutting times and high wire-length consumption rates.

A further limitation of the flatness, of the front and back of slices obtained from rods having wire engagement lengths that vary over the cut, that can be achieved by cut-off lapping consists in the form of a so-called "cut-in wedge" 28 (FIG. 2). This cut-in wedge comprises a slope, of the front and back in the transverse direction of the wire and toward the central plane of the slice, which extends over the entire slice width in the longitudinal direction of the wire.

In the case of cylindrical rods, the cut-in wedge is produced because, for example, at the instant at which the wire grid first makes contact with the rod, the engagement length of the wire portions and also, consequently, the wear on the wire are zero.

Since they initially have not been subjected to any wear, the wire portions that cut in first have a greater diameter than the wire portions that come into engagement later, which have already passed through kerfs of finite length and have therefore been subjected to wear. As the cut-in depth increases, therefore, the result is a wedge-shaped increased thickness 28 of the wafers. In addition, at the instant at which the wire portions first make contact with a cylindrical rod, the wire portions are tangential to the circumferential surface of the rod. At that point, less slurry is wiped off than as the cut progresses further, when the engagement lengths are finite and the contact of the wire portions with the circumferential surface of the rod becomes increasingly steeper—even precisely perpendicular in the region of greatest engagement length (half cut)—and a regular surge of stripped-off slurries builds up there, at the point where each wire portion enters the rod.

WO 2013/051183 A1 describes wire cut-off lapping by the pilgrim step method, in which conical wire guide rollers are used, the distance of the base of the grooves from the axis of the wire guide roller decreasing from the wire infeed side to the wire run-out side. As a result, when the rod with the rod axis is fed perpendicularly on to the wire guide roller axes, the wire portions of the wire grid that are on the wire infeed side are the first to come into engagement with the rod. Owing to the net motion of the wire, these wire portions advance from the wire infeed to the wire run-out side of the wire guide roller and have become thinner by abrasion, as a result of the rod being fed further on to the grid, until ultimately the part of the rod on the wire run-out side also comes into material-removing engagement with the wire grid, such that the formation of the cut-in wedge is counteracted.

Owing to the conical shape of the wire guide rollers, the lengths for respectively one winding around the wire guide roller decrease from groove to groove, from the wire infeed side to the wire run-out side. All grooves of each wire guide roller rotate with the same angular velocity, but not with a constant circumferential velocity, owing to the decrease in groove diameter from the wire infeed side to the wire run-out side. Since the wire is moved in the grid by the circumferential velocity of the grooves, however, the axial wire tension in the grid is therefore reduced from the wire infeed side to the wire run-out side.

It is known to persons skilled in the art who are familiar with wire cutting methods that the flatness of the kerf that is produced decreases as the longitudinal wire tension decreases. The method described therefore produces slices whose flatness worsens toward the wire run-out side.

This fundamental method deficiency also cannot be eliminated by, for example, the obvious means of using four wire guide rollers, selected so as to complement each other exactly, of which the upper two, which span the grid of the wire portions coming into contact with the rod, are provided with a groove depth that increases from the wire infeed side to the wire run-out side, and the lower two are provided with a groove depth that decreases from the wire infeed side to the wire run-out side. Although the lengths of the wire windings would then be constant over the entire length of the wire guide rollers, there would nevertheless be a pronounced forced slippage of the wires in the grooves, between the upper and the lower wire guide rollers, owing to the differing circumferential velocities, resulting from the differing diameters, at the same angular velocities. As a result of this, the grooves of the wire guide rollers would be subject to a large amount of wear and would consequently undergo differing cut-in by abrasion by the wire, with the result that the anticipated advantages of the method would already be eliminated in a very short time. WO 2013/051183 A1 does not discuss this putative solution to the problem of wear.

Moreover, an uneven wire tension in the grid has the effect that the wire longitudinal tensions of the wire portions must be selected so as to be very low, on average, over the grid, since the most highly tensioned wire portions, on the wire infeed side, may have at most the wire longitudinal tension at which the wire is still certain not to rupture (tensile strength), and therefore all other wire portions have a lesser tension that these wire portions. Consequently, the majority of the wire portions undergo wire flexure that increases toward the wire run-out side, with increasingly poorer wire guidance and worsening flatness of the wafers obtained.

Although the unevenness of the wire tension over the wire grid will be compensated somewhat by wire slippage, the method according to WO 2013/051183 A1 is therefore nevertheless unsuitable for execution according to the pilgrim step principle, because, in the second half of each pilgrim step, wire portions of short winding lengths on the wire run-out side would return to long winding lengths on the wire infeed side, causing them to become overtensioned and rupture there. This could be counteracted only by reducing yet further the wire longitudinal tension with which the wire is supplied to the grid in a controlled manner (setpoint longitudinal wire tension), in order to ensure a sufficiently reliable wire tension reserve ("headroom"), up to the wire rupture tension, in order to prevent wire ruptures during the cutting operation. This, however, would involve a yet more impaired flatness of the wafers obtained, owing to the imprecise and unreliable wire guidance in the kerfs.

The method specified in WO 2013/051183 A1 is therefore unsuitable for producing highly planar semiconductor slices for demanding applications.

U.S. Pat. No. 8,146,581 B2 discloses a method for wire cut-off lapping in which the axis of the rod is tilted slightly, in the feed direction, toward the axis of the wire guide rollers. In this case, the wire feed rollers have a cylindrical shape, their axes are disposed so as to be parallel to each other, and all grooves for guiding the sawing wire are incised to a uniform depth. When the rod is fed in therefore, an end-face rod end is cut into first and the opposite rod end is cut into last, owing to the tilting of the rod axis in relation to the axes of the wire guide rollers.

Since the circumferential velocities of all wire portions are equal, this method does avoid the problems resulting from wire tensions varying over the wire grid, as well as excessive groove wear caused by wire slippage; however, the axial tilt results in an additional force in the transverse direction of the wire and parallel to the rod axis (slope downforce). The slope downforce acts only in the instant of the respective cut-in of each wire portion, and vanishes as soon as the cut-in has been made. The cut face therefore runs with wires that, in the region of the cut-in, are deflected out of the cut plane produced by a cut without transverse force, and is therefore curved in that region. Since the slope downforce upon adjacent wire portions is approximately the same, the front and back of the sliced obtained are substantially parallel to each other, and have a uniform curvature for the front and back in the cut-in region. The slices obtained are thus of a substantially constant thickness, but have a curved or warped shape ("cut-in wave").

U.S. Pat. No. 8,146,581 B2 utilizes this cut-in wave, deliberately produced by tilting, to compensate a random cut-in wave that might be present on a wafer cut previously without a slope downforce. Obviously, the method may also be used to counteract a cut-in wedge, since, owing to the tilt, the individual wire portions effect cut-in in time succession along the rod axis, and are thus subjected to differing wear. This possible application is not identified by U.S. Pat. No. 8,146,581 B2.

Since, in the method according to U.S. Pat. No. 8,146,581 B2, owing to the rod tilt, cutting off is effected along planes that are tilted against the rod axis, the slices that are obtained have an unwanted misorientation. This misorientation could be compensated by correspondingly tilting the crystal axis in the opposite direction, against the rotation axis, during the preceding circular grinding of the rod. For this, however, it would be necessary to know in advance during circular grinding, for each rod, what tilt, and by what angle, would subsequently be necessary for a wire saw in order that the instantaneous inclination of this wire saw, for forming an cut-in wave, could be compensated precisely without the slices obtained having a misorientation. Clearly, for reasons of causality, this is not possible.

Slices cut off according to U.S. Pat. No. 8,146,581 B2 therefore always have an unwanted misorientation, such that the method is likewise unsuitable for producing slices for demanding applications.

SUMMARY

An aspect of the invention provides method for simultaneously cutting a multiplicity of slices from a cylindrical workpiece having a diameter, using, in the presence of a liquid cutting medium, a wire saw including a sawing wire, the sawing wire spanning a wire grid including a multiplicity of wire portions disposed parallelwise between rotatable wire guide rollers, the wire portions having a longitudinal tension and the wire portions defining a relative motion in relation to the workpiece as a result of rotation of the wire guide rollers with continual alternation between a first rotation direction and a second rotation direction, the second rotation direction being opposite to the first rotation direction, the method comprising: moving the sawing wire by a first length during rotation in the first direction; moving the sawing wire by a second length during rotation in the second direction, the second length being less than the first length; at a first instant, applying a greater longitudinal wire portion tension than at a second instant, wherein the first instant is at cut-in of the wire portions into the workpiece with a first cut depth, wherein the second instant is at a second cut depth, wherein the second instant is after the first instant, and wherein the second instant is one at which an engagement length L of the wire portions in the workpiece is greater than 0.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
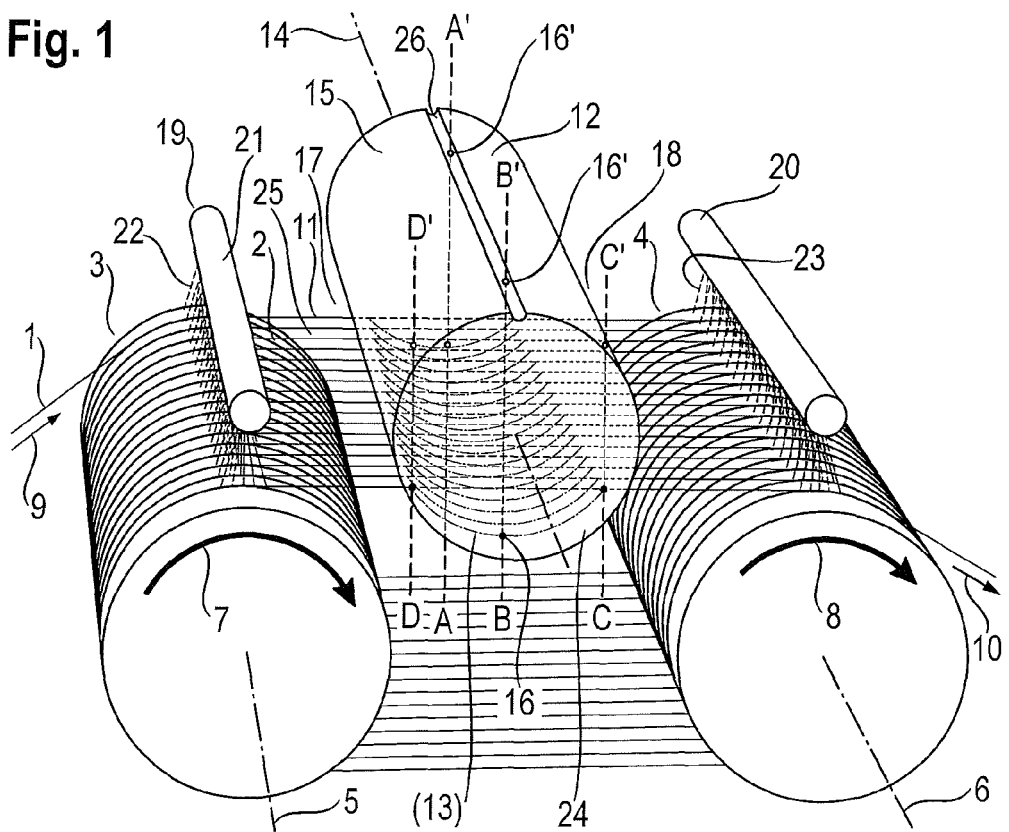
FIG. 1 shows a simplified representation of a cutting apparatus suitable for a multiwire cut-off lapping method, with all essential elements.
Figure 2:
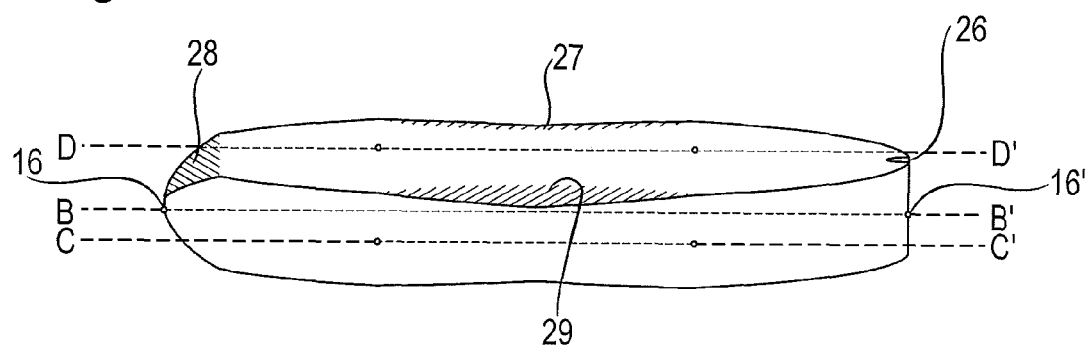
FIG. 2 shows a wafer produced by a method not according to the invention.

An aspect of the invention is to specify a multiwire cut-off lapping method, according to the pilgrim step method, for cutting off from a rod, slices that have uniformly high degree of flatness of their front and back, and that have a uniformly small cut-in wedge over all wire grid positions.

An aspect of the invention provides, separately or together, two groups of methods, of which the first group is aimed at reducing the effective diameter of the saw wire during cut-in, and the second group is aimed at reducing the thickness of the slurry film surrounding the saw wire during cut-in. The first group in this case comprises a first method, and the second group comprises a second, a third and a fourth method.

An aspect of the invention provides a first method for simultaneously cutting a multiplicity of slices from a cylindrical workpiece having a diameter, by means of a wire saw in the presence of a liquid cutting means, comprising a sawing wire, which spans a wire grid composed of a multiplicity of wire portions disposed parallelwise between rotatable wire guide rollers, the wire portions, having a longitudinal tension, describe a relative motion in relation to the workpiece as a result of rotation of the wire guide rollers with continual alternation between a first direction of rotation and a second direction of rotation, which is opposite to the first direction of rotation, the wire is moved by a first length during the rotation in the first direction, and by a second length during the rotation in the second direction, and the second length is less than the first, characterized in that, at the instant of the cut-in of the wire portions into the workpiece with a first depth of cut, the longitudinal wire tension portions is greater than at a second instant, with a second depth of cut, that is after the instant of the cut-in and at which the engagement length l of the wire portions in the workpiece >0.

An aspect of the invention provides a second method for simultaneously cutting a multiplicity of slices from a cylindrical workpiece having a diameter, by means of a wire saw in the presence of a liquid cutting means, comprising a sawing wire, which spans a wire grid composed of a multiplicity of wire portions disposed parallelwise between two rotatable wire guide rollers, the wire portions, having a longitudinal tension, describe a relative motion in relation to the workpiece as a result of rotation of the wire guide rollers with continual alternation between a first direction of rotation and a second direction of rotation, which is opposite to the first direction of rotation, the wire, during the rotation between each pair of directly successive reversal of direction in the first direction, is in each case moved with a first velocity, by a first length in each case, and during the rotation in the second direction is in each case moved with a second velocity, by a second length in each case, and the second length is shorter that the first, characterized in that, at the start of the cutting operation, a first mean velocity of the wire between two successive changes of direction, formed from the first and the second velocity, and, at the end of the cutting operation, a second mean velocity of the wire between two successive changes of direction, formed from the first and the second velocity, are selected, wherein the first mean velocity is less than the second mean velocity.

An aspect of the invention provides a third method for simultaneously cutting a multiplicity of slices from a cylindrical workpiece having a diameter, by means of a wire saw in the presence of a liquid cutting means, comprising a sawing wire, which spans a wire grid composed of a multiplicity of wire portions disposed parallelwise between two rotatable wire guide rollers, the wire portions, having a longitudinal tension, describe a relative motion in relation to the workpiece as a result of rotation of the wire guide rollers with continual alternation between a first direction of rotation and a second direction of rotation, which is opposite to the first direction of rotation, the wire is moved by a first length during the rotation in the first direction, and by a second length during the rotation in the second direction, and the second length is less than the first, characterized in that, from the start of the cutting operation until the attainment of a first depth of cut, the supplied hard substances of the cutting means have a first mean particle diameter, and after attainment of the first depth of cut, until the end of the cutting operation, the supplied hard substances of the cutting means have a second mean particle diameter, and the first mean particle diameter is less than the second mean particle diameter.

An aspect of the invention provides a fourth method for simultaneously cutting a multiplicity of slices from a cylindrical workpiece having a diameter, by means of a wire saw in the presence of a liquid cutting means, comprising a sawing wire, which spans a wire grid composed of a multiplicity of wire portions disposed parallelwise between two rotatable wire guide rollers, the wire portions, having a longitudinal tension, describe a relative motion in relation to the workpiece as a result of rotation of the wire guide rollers with continual alternation between a first direction of rotation and a second direction of rotation, which is opposite to the first direction of rotation, the wire is moved by a first length during the rotation in the first direction, and by a second length during the rotation in the second direction, and the second length is less than the first, characterized in that, from the start of the cutting operation until a first depth of cut, a suspension having a first viscosity is supplied to the wire grid and, from the first depth of cut until the end of the cutting operation, a suspension having a second viscosity is supplied to the wire grid, wherein the first viscosity is selected so as to be less than the second viscosity.

An aspect of the invention provides simultaneous application of any combination of two or more methods from the four methods mentioned.

The four methods according to the invention are preferably used for slicing a rod of semiconductor material by means of a wire saw. Particularly preferably, the semiconductor rod is in the form of a straight circular cylinder.

The four methods according to the invention are performed in the presence of a liquid cutting means, which comprises a carrier liquid and loose hard substances, which are present in the carrier liquid. The liquid cutting means (suspension) is also referred to as a slurry.

The four methods according to the invention are preferably executed with the use of a structured monofilament steel wire.

The four methods according to the invention are likewise preferably executed with the use of a torsion wire. Torsion refers to a helical turning of the wire about its longitudinal axis as a result of elastic twisting of the wire.

A structured wire is, in particular, a wire having a first diameter, the wire having being provided, as a result of plastic deformation in the transverse direction of the wire, with a multiplicity of elevations and indentations, in the form of a zigzag, the envelope curve of which, in the plane perpendicular to the average longitudinal direction of the wire, has a second diameter that is greater than the first diameter.

The first diameter thus comprises the diameter of the "core wire" from which the structured wire was produced by plastic deformation. The second diameter, the "effective diameter" of the structured wire, comprises the core diameter plus the peak-to-peak amplitude of the wave-shaped deformations.

The first method according to the invention, with an initially higher cut-in wire tension, is particularly advantageous if structured wire is used. The latter has a multiplicity of wave-shaped, lateral wire deformations of a certain amplitude that are repeated at a periodic interval over the longitudinal direction of the wire ("undulated wire," "crimped wire").

Examples of structured wires with which the methods according to the invention may be performed are described, for example, in JP2004243492 A2 or EP1827745 B2.

JP2004243492 A2 describes a wire having wave-shaped elevations or protuberances, whose amplitude extends in a transverse plane of the wire or winds helically around the wire in the longitudinal direction of the wire.

EPI 827745 B2 discloses a wire having wave-shaped protuberances of a first amplitude and a first wave length in a first transverse direction of the wire, and having a second amplitude and a second wave length in a second transverse direction of the wire, the first and the second amplitude and the first and the second wave length being selected so as to differ in each case, and the first transverse plane being perpendicular to the second transverse plane.

These waves provide the wire with an apparent diameter, averaged over its average longitudinal direction, which is greater, by the peak-to-peak amplitude of the lateral deflections, than the diameter of the wire core. In order for the effective cross section to appear approximately circular and isotropic, averaged over the longitudinal direction of the wire, this deformation must be oriented at least in both mutually perpendicular transverse direction, i.e. two mutually perpendicular, mutually superposed wave structures.

A further possibility consists in imparting a wave shape to the wire in only one transverse direction, and then subjecting the wire to torsion ("twisting") about its average longitudinal axis, such that the wave-shaped deflection goes around the wire in the form of a helix.

The first method according to the invention is thus also particularly advantageous if the wire simultaneously has the features of structuring and torsion.

The wire cross section itself may also be deformed in a period manner, in transverse directions that are perpendicular to each other, resulting in an oval cross section that changes or—again by twisting the wire—"rotates" in a periodic manner.

A feature of structured wire is that it improves the transport of slurry into the kerf, since a reserve of slurry can be trapped in the indentations ("pockets") of the wire surface, without being immediately stripped off when the wire enters the kerf and subsequently passes through the kerf. As a result, the kerfs achieved are of improved quality (less abrasive scoring), and larger workpieces, or workpieces of a given size, can be sawn more rapidly (shorter time for a complete cutting operation).

Each cutting operation, i.e. the moving of the wire, or the wire portions, of the wire grid over a complete cross sectional face of the workpiece for each kerf, is preferably performed with new wire, i.e. wire not used in a previous cutting operation, since the wire undergoes wear as it removes material from the workpiece. Because of the wear, the wire increasingly loses its round shape. Since the wire undergoes a random torsion during the cutting operation, wires that are not round produce kerf thicknesses, and therefore slice thicknesses, that vary within short cut advance intervals. These variations in the thickness of the wafers resulting from the cut are referred to as saw marks, and are undesirable.

The wire is wound from a pay-off coil (supply coil) to a take-up coil (receiver coil) at a selectable speed. The wire in this case is wound around at least two wire guide rollers having a multiplicity of grooves that are perpendicular to the axes of the wire guide rollers. The wire portions present between the two wire guide rollers constitute the wire grid. The grid thus comprises a multiplicity of portions of the wire that run, parallel to each other, in one plane.

The wire is supplied to the wire grid from the pay-off coil, via the wire guide rollers delimiting the wire grid, with a longitudinal wire tension that is controlled by feedback control. The feedback control of the wire tension is preferably effected by means of a so-called dancer.

In the run-in to and run-out from the wire grid, the longitudinal wire tension in the running direction of the wire is controlled by means of deflection rollers, which are attached to levers, an alteration of the angle of the levers in relation to the longitudinal direction of the wire causing the running length of the wire to be changed, and thus enabling the wire to be tensioned to a greater or lesser degree.

The torque exerted upon the lever by the wire provides a measure of the actual wire tension, such that, by means of torque measurement and angle adjustment, there is a closed loop for feedback control of the longitudinal wire tension. Levers having a deflection roller are referred to as "dancers" because of their rapid back and forth motion as control deviations occur.

When the sawing wire is then moved in the longitudinal direction of the wire during the cutting operation, the wire tension may fluctuate because of fluctuating friction as the wire is wound off from the wire coil, as it passes through the numerous kerfs (cutting operation), or as a result of bearing friction of the wire guide rollers or various deflection rollers for guiding the wire in the cutting apparatus. Measuring the torque and moving the lever arm in the appropriate direction by means of a closed feedback control loop enables this fluctuation to be kept low.

Since, in the cutting operation, the wire is moved rapidly in the longitudinal direction of the wire (typically some 10 m/s), any wire tension fluctuations occur in correspondingly rapid succession, and the lever arm "dances" very rapidly, with a correspondingly rapid alternation, first in one angular direction and then in the other angular direction about its axis of rotation, which gives the lever its name.

The wire tension with which the wire is supplied to the wire grid, via the wire guide rollers delimiting the wire grid, determines in turn the wire tension of the wire portions in the wire grid.

The wire tension in the grid is a determining factor for the achieved flatness of the slices cut off from the workpiece. The wire tension in the grid must be selected such that there is certainty that none of the wire portions in the grid will yet rupture, i.e. the wire must be supplied to the wire guide rollers with the wire tension (setpoint longitudinal wire tension) at which a sufficiently reliable wire tension reserve is ensured, up to the wire rupture tension, during the cutting operation.

For the purpose of cutting the cylindrical workpiece, having a diameter, into a multiplicity of slices, the workpiece is fastened in a wire saw by means of a mounting strip. By means of a feed device, the workpiece is guided perpendicularly from above, through the wire grid, a suspension of hard substances in a carrier liquid being supplied as a cutting means to the wire portions of the wire grid while, at the same time, the wire guide rollers are rotated with a continual alternation between a first direction of rotation and a second direction of rotation that is opposite to the first direction of rotation.

During the rotation of the wire guide roller in the first direction, the wire—and thus the wire portions in the wire grid—is moved by a first length, and during the rotation in the second direction it is moved by a second length, in each case relative to the workpiece, the second length being shorter than the first (pilgrim step method).

A pilgrim step comprises a back and forth motion of the wire, the wire being advanced in total by a wire length corresponding to the difference of both lengths (net wire motion), i.e. is wound from the pay-off coil to the take-up coil. If, for example, the first length (forward motion) is 500 m and the second length (return motion) is 300 m, the net wire motion is 500 m-300 m=200 m.

In the methods according to the invention, the slicing of circular cylindrical workpieces (for example semiconductor rods) is always necessarily effected along strictly convex cutting faces. Strictly convex refers to a face, for which each segment connecting any two points on the peripheral line of the face always runs fully within the face, apart from the end points of the segment.

In particular, the length, or engagement length l, that is run by the wire portion within the workpiece is equal to zero at the instant at which the wire portions first make contact with the surface of a rod having strictly convex cutting faces, increases steadily up to a maximum (corresponding to half the diameter of the circular cylindrical workpiece), as the depth of cut of the wire grid increases in the course of the further cutting operation and, following attainment of the maximum, decreases steadily again, to become zero again at the end of the cutting operation, i.e. at the instant of final contact of the wire portions with the surface of the workpiece.

The First Method

The first method is based on the observation that, as the longitudinal tension of the wire is increased in the wire infeed, and therefore in the wire grid, the width of the kerf decreases. The effect of kerf width decrease is small for plain and strong for structured wires. In the case of plain wires, the natural motion in the transverse direction of the wire (vibration) is probably shifted to higher frequencies as the wire tension increases. Higher frequencies, in turn, undergo greater damping in the viscous sawing slurry, with the result that the amplitude of the vibration, and therefore the width of the kerf produced, is reduced.

Wires provided with a kinked, waved or helical structure when produced by plastic deformation in the transverse direction, in order to improve the adhesion and transport of the sawing slurry ("waved wire"), are additionally stretched as the longitudinal wire tension increases. Reduced vibration and stretching result in a reduction in the effective or working diameter of the wire, and thus in a reduction of the kerf width and an increased thickness of the cut-off slices.

When cylindrical workpieces are cut along strictly convex cutting faces, the wire tension may be selected to be substantially higher, at least at the instant of cut-in (first contact of the wire with the workpiece), than in the rest of the cutting operation, without rupture of the wire. This is possible because the additional mechanical load on the wire, caused by its motion through the viscous slurry, and the friction caused by the material-removing work done also become insignificant as the engagement length becomes insignificant. As the engagement length l of the wire portions in the workpiece increases, the mechanical load on the wire portions also increases, such that the sufficiently safe wire tension reserve, up to the wire rupture tension, is less than at the instant of cut-in, at which the engagement length is zero.

In the first method according to the invention, the longitudinal wire tension in the wire infeed—and thus in the wire grid—and in the wire run-out is varied in dependence on the engagement length l of the wire portions of the grid in the workpiece, i.e. the sawing process is performed with longitudinal tensions of the wire portions in the wire grid that differ in respect of time. At the instant at which the wire portions cut into the workpiece, the longitudinal wire tension portions is higher than at a second instant, which is after the instant of cut-in.

In a first preferred embodiment of the first method according to the invention, in the cutting of cylindrical workpieces along strictly convex cutting faces, in the case of a depth of cut of ≤2% of the diameter of the workpiece, the wire tension is increased by ≤80%, and in the case of a depth of cut of ≤5% of the diameter of the cylindrical workpiece, the wire tension is increased by ≤50%, relative to the tension of the wire when the engagement length l of the wire portions is equal to the diameter of the workpiece, i.e. when the engagement length l is maximal.

This wire tension in the case of a maximal wire engagement length is the least tension with which the wire is supplied to the grid during the entire cutting operation. It is selected to be of just such a magnitude that it is certain that the wire will not yet rupture. For example, it may be selected such that a wire rupture occurs maximally in a defined fraction of cuts, for example in 1% of all cuts. (Wire rupture rates significantly less than 1% are not achievable, even with any lesser wire tension, since the wire itself has production defects that occasionally result in rupture). The exact choice of this minimal tension depends on numerous factors: the wire diameter, the size of the maximum engagement length (diameter of the workpiece), the total length of the wire used for a complete cutting operation (and thus the reduction in cross section of the wire as a result of wear), the longitudinal velocity of the wire, the rate of advance of the workpiece, the composition of the slurry, and many other factors. The suitable minimum tension is therefore determined experimentally.

Since the wire grid accommodates a not inconsiderable length of wire, this minimum tension with which the wire is supplied to the grid should already have been attained as long before the attainment of a maximal engagement length as it takes until the length of wire corresponding to the wire present in the grid has been supplied. As a result, even the wire portions on the wire run-out end of the grid, which is reached last by wire having a changed infeed tension, have a sufficiently low tension not to rupture at the instant of longest engagement length and, consequently, of greatest load on the wire.

Accordingly, the tension of the wire supplied to the grid can already be increased again, as long before attainment of the longest engagement length at which the wire tension is to be at its least, as it takes until the supplied wire, having the selected tension, has worked from the wire infeed side to the wire run-out side of the grid as a result of the net motion of the wire. Alternatively, the wire tension may also be kept constant in the second half of the cutting operation, for example in order to reduce yet further the risk of a wire rupture; this is because repairing a wire rupture in the second half of a cut is particularly demanding. Moreover, the out-cut out of the rod is always made with worn wire; the problem of an "out-cut wedge", corresponding to the cut-in wedge, therefore does not exist.

For example, in the case of a cylindrical workpiece having a diameter of 300 mm, the wire tension can be increased, up to a depth of cut of 6 mm, by up to 80% relative to the wire tension at which it is certain that the wire will not rupture in the region of a longest engagement length l, and up to a depth of 15 mm it can still be increased by up to 50%.

As the engagement length l of the wire portions in the workpiece increases, the force acting upon the wire in the tensile direction (longitudinal direction of the wire)

increases progressively because of the viscous friction that is built up by the wire owing to the shear rate in the slurry film that builds up between the wire and the cut face (direction of rod axis, transverse to wire) and the cut front (advance-oriented transverse direction of wire). The force acting upon the wire in the tensile direction (longitudinal direction of the wire) is determined only to an ever decreasing extent by the longitudinal wire tension, controlled from outside by means of the dancers, with which the wire is conveyed to or out of the wire grid, i.e. the longitudinal wire tension to or from the grid differs from the longitudinal wire tension in the grid.

If the wire engagement length l, upon cut-in (first contact of the wire with the workpiece) is zero, the viscous friction in the kerf also is zero, such that almost the full breakage load (tensile strength) of the wire can be applied by the dancers, and there is no need to take account of a wire tension reserve for the viscous friction in the kerf.

An example is given in the following for the first method: In a comparative example, not according to the invention, relating to the first method, a monofilar cut-off lapping wire made of hardened carbon steel C90, having a diameter of 175 μm, and having a manufacturer's rated tensile strength of 82 N, was first used to cut a straight cylindrical rod of monocrystalline silicon having a diameter of 300 mm, the mean rod feed rate being 0.4 mm/min and the wire use being 164 m/wafer. The longitudinal wire tension at which the wire was only just certain not to rupture was found to be 30 N.

In an example relating to the first method, an identical wire, having the same parameters (mean rod feed rate 0.4 mm/min, 164 m/wafer wire use, 300 mm rod diameter, 30 N wire tension in the region of longest engagement length), was used, the longitudinal wire tension, controlled by the dancers, in the wire infeed and run-out having been increased upon cut-in and to 54 N up to a depth of cut of 6 mm, and to 45 N up to an incision depth of 15 mm.

Figure 3A:
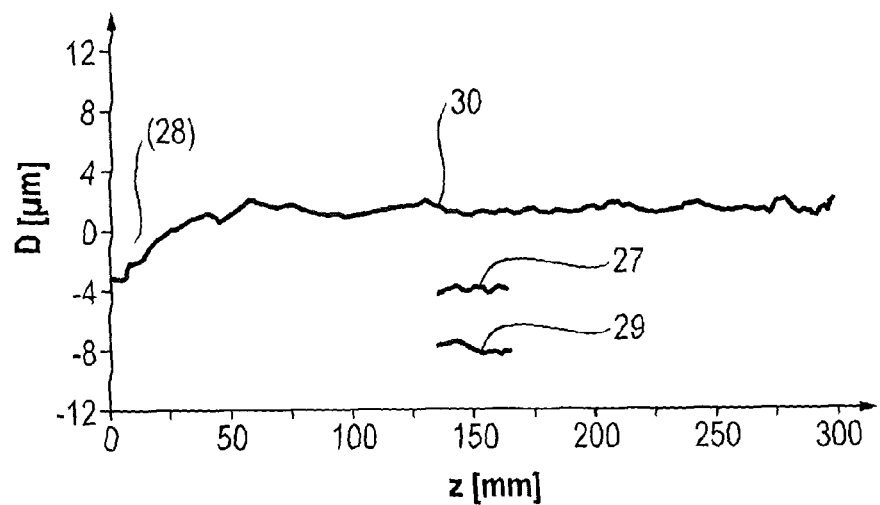
FIG. 3A shows characteristic of the center thickness of a wafer produced by a method not according to the invention, along section line A-A'.
Figure 3B:
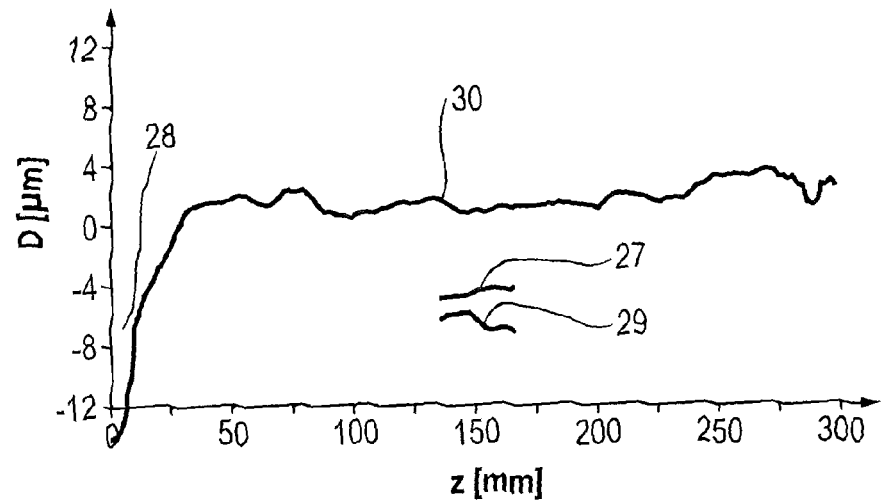
FIG. 3B shows characteristic of the center thickness of a wafer produced by a method not according to the invention, along section line B-B'.

FIG. 3 shows the characteristic 30 of the thickness of two wafers of a 300 mm silicon rod that were obtained in the comparative example, FIG. 3 (A) showing one wafer from the wire infeed side 12 of the silicon rod 15 in FIG. 1 with a thickness measurement along the diametric cut line A-A', and FIG. 3 (B) shows one wafer from the wire run-out side 24 of the rod 15 along B-B'. In FIG. 3 (A) and FIG. 3 (B) the thickness characteristics were measured parallelwise, along chords close to the periphery in the region of a longest wire engagement length, i.e. when the rod has been half cut through, parallel to the center line A-A' and B-B' respectively, once (thickness profile 27) on the wire entry side (17 in FIG. 1) along D-D', and once (thickness profile 29) on the wire exit side (18 in FIG. 1) along C-C'. The depth of cut z=0 mm in this case corresponds to the breakthrough point 16 (incision), and z=300 mm corresponds to the breakthrough point 16' (out-cut) of the diametric cut line B-B' (FIG. 3 (B)) and analogous to the diametric cut line A-A' (FIG. 3 (A)), the breakthrough point being the point at which the sawing wire enters or exits from the workpiece.

The diametric thickness profiles of wafers from the end of the rod on the wire infeed side always have only one slightly, or wholly insignificant, decrease in thickness 28 in the incision region (FIG. 3 (A)). However, the decrease in thickness 28 then increases continuously from wafer to wafer, from the wire infeed end to the wire run-out end of the rod, and is finally greatest for wafers from the end of the rod on the wire run-out side ("cut-in wedge" 28 in FIG. 3 (B)). This is an entirely unexpected observation, which does not have an obvious explanation. An attempted explanation, which also proved to be material to the realization of the other methods according to the invention, was based on the following two observations and considerations:

Firstly, the wire portions of the wire grid that come into engagement with the rod upon incision are composed substantially of unused, thick wire, since the preceding step always ends in the mounting strip by which the rod is fastened to the feed device. The material of the mounting strip—in the stated examples and comparative examples relating to the methods according to the invention, a strip of hard carbon—is too soft to cause significant wear on the wire. The wire grid cuts into the carbon strip to a depth of a few millimeters, to ensure that all wire portions of the grid have cut completely through the rod. In the stated examples, cutting into the mounting strip at the end of the cut was effected to a depth of approximately 7 mm.

The cutting of the wire grid into the carbon strip to a depth of a few millimeters lasts sufficiently long for the supply of wire in the grid to be replaced completely, at least once, by the net motion of the wire, over the pilgrim steps being executed at the time. Thus, in the case of the succeeding rod, the wire in the grid is thick, since it has virtually no wear.

Secondly, it is the case that the cut-in is effected either with the wire portions that, in the case of the preceding cutting operation, have ended the out-cut in the carbon strip, or by wire of a new coil, if the wire supply remaining on the wire coil after the preceding cutting operation is no longer sufficient for a further cutting operation and it has been necessary to change the coil. Since the carbon strip is easily cut through and therefore causes almost no wearing of the wire, the cut-in thus always occurs with wire that is almost fresh (carbon strip) or fresh (coil change).

It was observed that only a small amount of slurry adheres to fresh wire, i.e. a wire with a smooth surface. The slurry film that surrounds a fresh wire is therefore thin. Close to the end face of the rod on the wire infeed side, the increase in the kerf, resulting from the greater thickness of the fresh wire, and the decrease in the kerf, resulting from the reduced thickness of the slurry film, are approximately in equilibrium, such that wafers that have been cut out from rod positions on the wire infeed side of the rod have no cut-in wedge, or have only a slight cut-in wedge.

On the opposite, wire run-out, side of the rod, the wire has already passed through a multiplicity of kerfs, and has therefore been subjected to wear. It was observed that worn, wire, i.e. wire with a rough surface, provides better adhesion of the slurry and is therefore surrounded by a substantially thicker slurry film. At the end face of the rod on the wire run-out side, the decrease in the thickness of the wire caused by wear is more than compensated by the increased thickness of the slurry film due to the roughening of the wire. This explains, from the observations made and considerations addressed, the fact that wafers from rod positions close to the wire run-out side of the rod have a pronounced incision wedge.

Overall, the cut-in wedge, which impairs the desired uniform thickness of a wafer, thus increases continuously, from wafers cut out from rod positions on the wire infeed side, toward wafers cut out from rod positions on the wire run-out side.

The first method according to the invention makes it possible to produce substantially narrower incision kerfs in that, at the instant of incision, the wire portions present in the grid have a substantially higher longitudinal wire tension than is set subsequently, in the further course of the cut, by means of the dancers. The widening of the kerf is counteracted by the greatly increased longitudinal tension of a transverse deflection of the wire in the axial direction of the rod.

It was observed that, in the case of a structured wire, the tension up to which the wire tension can be increased during the incision can be set even higher again than the maximum tension that can be selected for a plain, unstructured wire of an identical core diameter.

Some of the wire tension reserve, up to wire rupture, is used up by unforeseeable, instantaneous load peaks that occur, for example, because of the inertia of the tension feedback control by the dancers, or as a result of unforeseen brief blockages of the wire transport in the wire management system, which consists of many moving elements.

Moreover, the deformations ("waves") of the structured wire that is used in preference in the first method according to the invention provide an additional spring action, which can absorb spontaneous peaks of the longitudinal wire tension, such that, in the case of structured wire, a lesser tension reserve, up to wire rupture, has to be available to enable sawing to be effected with certainty of no wire rupture.

Of the various structured wires, it was possible to use wire having a constant cross section and lateral protuberances ("waved wire") with the highest tension at which there was still certainty of no wire rupture. Such wire is therefore preferred.

As the longitudinal wire tension increases, the waved wire becomes somewhat elongated, the lateral deflections become somewhat flatter, and the effective cross section of the waved wire decreases. Thus, with the use of waved wire in the first method according to the invention, the desired effect of kerf tapering as a result of increased longitudinal wire tension is particularly pronounced in the method according to the invention, and the use of waved wire is particularly effective in counteracting the development of an incision wedge of the wafers obtained.

In contrast to the prior art, the first method according to the invention, with the use of waved wire, is characterized by a considerable increase in the longitudinal wire tension, up to almost the breaking limit of the wire. The effective diameter of the waved wire in this case is reduced virtually to that of the plain wire from which the structured wire was formed, without rupture of the waved wire. Depending on the type of waved wire, the effective diameter can be reduced by up to 20 µm by this "slimming".

As a result of the slimming, the "pockets" for slurry that are formed by the waved structure become shallower, and the capacity of the wire to transport slurry gradually approaches that of a comparable plain wire that does not have "pockets".

The reduction of the slurry film surrounding the wire additionally favors a narrow kerf, and thus results in a correspondingly thicker wafer, as desired for achieving the object of the invention.

In a second embodiment of the first method according to the invention for achieving a thinner kerf at the instant of sawing-in, it is already sufficient if the wire portions in the wire grid have a substantially higher longitudinal wire tension before the incision, and, subsequently, wire is supplied with a normal, non-increased, longitudinal wire tension during the further cutting operation.

It was thus also possible in this case, for example, before commencement of the cutting operation, for the grid to be fitted with wire having a wire tension increased by up to 80% relative to the wire tension at which the wire is usually supplied, and at which there is still certainty of no wire breakage occurring, even in the case of greatest wire engagement length, and thus greatest wire load, without this resulting in a greater risk of wire breakage upon cut-in into the workpiece.

The reason for this, as described, is that it takes some time until the wire supplied to the wire grid with the lower wire tension has worked through the grid, evenly changing the longitudinal wire tension, and has thus changed the tension of all wire portions in the grid. Until this has been achieved, the cut is already so deep and the engagement lengths l of the wire portions are so long, because of the feeding of the rod, that, owing to the wear on the wire that then occurs in the case of an appropriately selected wire solution (choice of the first and second lengths of the pilgrim step in dependence on the incision depth), a further cut-in wedge can be counteracted by the measures known in the art.

In various examples relating to the second embodiment of the first method according to the invention, 300 mm silicon rods of lengths of up to 400 mm were cut up into an average of 350 wafers, and in this, in various cutting operations, a total of between 40 and 120 km, having a diameter of 175 µm, was used per cutting operation, corresponding to between 115 and 340 m of wire per wafer, or an average of between 130 and 400 m of wire per millimeter of incision depth in the rod. The manufacturer's rated breaking limit of the wire was at least 74 N. In the case of the wire saw used, the length of wire used to fully fit the wire grid was approximately 1200 m (approximately 400 windings, each approximately 2.5 m in length). Before commencement of the cut, 1200 m of wire were supplied to the wire grid, at a tension of 54 N, and the cutting operation was commenced. Owing to the net motion of the wire, the wire fitted in the wire grid had consequently already been fully replaced at an incision depth of 3 to 9 mm, and all wire portions in the grid then had the reduced basic tension, with which the wire was supplied from the commencement of the cut onwards (30 N). With use of 175 µm waved wire, it was even possible for the increased basic tension of the prefitted wire of the wire grid to be increased to 60 N, and for the reduced basic tension, after commencement of the cut, to be increased to 36 N, without the risk of a wire breakage having become noticeably greater.

During the cut, the wire undergoes a transverse deflection of the wire in the direction of advance of the rod, the wire flexure, which is dependent on the rate of material removal. This additionally increases the required depth of cut from which effective wear of the wire occurs as a result of sufficient available chip volume.

In effect, only the restoring force of the wire resulting from this wire flexure causes the shear rate in the slurry film between the wire portions and the base of the kerf at which the cutting operation progresses. The shear rate, i.e. the ratio of the relative velocity and the film thickness, determines the material removal rate; cf. F. W. Preston, J. Soc. Glass Technol. 11 (1927) 214-256.

The Second Method

The second method according to the invention makes it possible to achieve reduced kerf thicknesses in that the thickness of the slurry film surrounding the wire, and thus the thickness of the kerf, is reduced by substantially lesser mean velocities of the longitudinal motion of the wire over the first and second lengths of the pilgrim steps.

The thickness of the slurry film surrounding the wire is influenced by hydrodynamic processes, the film thickness being composed of a dynamic and a static component. The dynamic film thickness is influenced by shear rates resulting from the relative velocity of the wire in relation to the workpiece, the static film thickness being influenced because of the pressure resulting from wire flexure in the case of a given viscosity counteracting slurry runoff.

The reduction in the shear rate in the case of a lesser wire velocity causes a decrease in the hydrodynamic pressure, which in turn determines the film thickness of the slurry surrounding the wire, as well as a longer dwell time within a given engagement length, and an increased slurry runoff as a result of the viscous carrier liquid being pressed out of the kerf by the hydrodynamic pressure in the slurry film built up by the transverse wire stress.

Moreover, in the case of very high wire velocities, the uniform wetting of the wire, passing the slurry nozzles at high speed, is impaired, since wetting is also a function of time. This results in irregular kerf widths, which results in unwanted saw marks on the surfaces of the wafers obtained.

In the case of wire cut-off lapping, the velocity of the wire in the longitudinal direction of the wire (wire velocity) is preferably between 5 and 20 m/s. Higher wire velocities normally do allow higher possible rod feed rates, and thus a more rapid cutting progress, but they also result in widening of the kerf because of an increase in the thickness of the slurry film surrounding the wire. The increasing economic efficiency resulting from increasing cutting speed is thus counteracted by a decreasing yield (wafers per rod length) as a result of kerf widening, such that there is an optimum wire velocity. This velocity is approximately 10 m/s.

The second method according to the invention relates to wire sawing by the pilgrim step method. In the case of the pilgrim step method, the longitudinal motion of the wire is effected with continual changes of direction. A pair of longitudinal motions of the wire, between two successive changes of direction, is referred to as a pilgrim step. A pilgrim step comprises precisely a moving of the wire by a first length in a first direction, at a first velocity, and a subsequent moving of the wire by a second length in a second direction that is exactly opposite to the first direction, at a second velocity. The second length in this case is selected so as to be less than the first length, such that, during a full pilgrim step, the said wire supply advances by a length determined by the difference of the two lengths ("net wire motion" during a pilgrim step).

The first and the second velocity are preferably equal.

Likewise preferably, the first and the second velocity are unequal. Furthermore, preferably, the first and the second velocity are each variable in respect of time.

Owing to the inertia of the masses involved, the change of direction of the wire motion does not occur abruptly, but comprises phases of acceleration and retardation.

In general terms, therefore, a mean wire velocity over a pilgrim step, formed from a first and a second velocity, is obtained for each wire motion in one direction.

The second method according to the invention comprises two mean velocities, each calculated from the two velocities of the longitudinal motion of the wire in the two opposing directions of a pilgrim step, and is characterized in that the start of the cutting operation is effected with a first such mean velocity, and the end of the cutting operation is effected with a second such mean velocity, wherein the first mean velocity is selected so as to be less than the second mean velocity.

In the second method according to the invention, at the start of the cutting operation a first mean velocity of the wire, between two successive changes of direction, is selected, and at the end of the cutting operation a second mean velocity of the wire, between two successive changes of direction, is selected, the first velocity being less than the second velocity.

Preferably, the second mean velocity is between 6 and 20 m/s, particularly preferably between 8 and 15 m/s.

The first mean velocity is preferably between 10 and 90%, and particularly preferably between 20 and 80% of the second mean velocity.

Owing to the lesser mean velocity of the longitudinal motion of the wire during the incision, less slurry is carried along by the wire, and more time remains, between wetting of the wire with slurry and the entry of the wetted wire portion into the kerf, and also during the longitudinal wire motion of the wetted wire portion through the kerf, for the slurry to drip off the wire. The result is a less thick slurry film surrounding the wire during the start of the cutting operation. The width of the kerf produced by the wire and the slurry, which is determined by the wire diameter and the thickness of the slurry film around the wire, is therefore less at the start of the cutting operation than at the end of the cutting operation, when, according to the invention, the mean velocity of the longitudinal motion of the wire is greater, the slurry film surrounding the wire is thicker, and the kerf, determined by the wire diameter and the thickness of the slurry film, is wider.

The Third Method

The third method according to the invention makes it possible to achieve reduced kerf thicknesses in that, with smaller mean particle diameters in the slurry, and with other parameters remaining the same, the mean thickness of the slurry film, and therefore the width of the kerf, is also reduced.

The third method according to the invention is characterized in that, at the start of the cutting operation, a slurry is used whose mean particle size is less than the mean particle size of the slurry during the rest of the cutting operation.

Preferably, at the instant of the cut-in, a small quantity of fresh slurry, containing a more fine-particled abrasive, is supplied to the wire grid.

Likewise preferably, a small quantity of used slurry (old slurry), whose particle has a lesser mean particle size because of wear, is supplied to the wire grid at the instant of the cut-in.

Likewise preferably, a small quantity of fresh slurry, which contains a more fine-particled abrasive, and a small quantity of used slurry are supplied to the wire grid at the instant of the cut-in.

A small quantity in this case corresponds to 5 to 50% relative to the total quantity of slurry used during the removal of material from the workpiece.

Since the slurry consumption is low during the first millimeters of cut depth, and the addition of the fine-particle slurry is effected only for a short time, because of the rapid infeed of the rod, owing to the small chip volume, the mean particle size of the slurry present in the system's storage tank changes only insignificantly as a result of the addition of small quantities of fine-particle slurry.

Upon attainment of the first depth of cut, at which the wire grid has penetrated into the workpiece to a depth of a few millimeters, the fine-particle slurry is replaced, until the workpiece has been cut through completely, by the slurry whose mean particle diameter is greater than the mean particle diameter of the fine-particle slurry. Preferably, the mean particle diameter of the fine-particle slurry is between 50 and 80% of the second mean particle diameter.

Preferably, the first incision depth is 2% or 5% of the greatest engagement length of a wire portion in the workpiece, wherein the greatest engagement length, in the case of a circular cylindrical body, corresponds to the diameter of the workpiece.

In a practical embodiment of the third method according to the invention, the procedure is preferably as follows:

The quantity of slurry required for a cutting operation is present in the machine tank of the saw, and is circulated continuously via the slurry nozzles and wire grid during cutting. At the end of the cutting operation, some of the quantity of slurry present in the tank is replaced with fresh slurry. This process is referred to as "slurry regeneration".

At the end of a cutting operation, the supply of slurry present in the tank is fine-particled, because of wear. If, following completion of the cut, the regeneration quantity of slurry is removed, but the quantity removed is not immediately replenished with fresh slurry before commencement of the next cut, and the next cut is started with the partial quantity of slurry remaining in the tank, the incision is thus effected with used, i.e. particularly fine-particled, slurry. The regeneration quantity of fresh, coarse-particled slurry is preferably added only, and if necessary also gradually, when the running cut has reached increasingly longer wire engagement lengths for which fresh, strongly cutting coarse slurry is particularly required. This successive replenishing of the previously removed regeneration quantity only after the cut-in period is referred to as "slurry charging".

As a result of a regeneration quantity of slurry being removed from the machine tank at the end of the preceding cut, and the removed quantity being replenished only in the course of the current cut (charging), an incision with a finer granularity, and consequently a narrower kerf and therefore resultant wafers without an incision wedge, can be realized in a particularly simple manner.

In an actual example for this latter embodiment of the third method according to the invention, by regeneration and charging, the supply of slurry in the machine tank of the wire saw for a cut was 150 l, and the regeneration quantity removed at the end of the cut was 75 l. Thus, in the subsequent cutting operation, the incision was effected with a starting quantity of 75 l of slurry having a cutting particle that had become spent by the preceding cut, i.e. fine particle. The 75 l was then progressively replenished with added partial quantities in approximate proportion to the engagement length (charging), the first, smallest addition being effected after cutting to a depth of 6 mm, and the final, largest partial addition being effected at 120 mm, i.e. shortly before reaching the longest wire engagement length (cut depth of 150 mm, engagement length of 300 mm per kerf).

Figure 5:
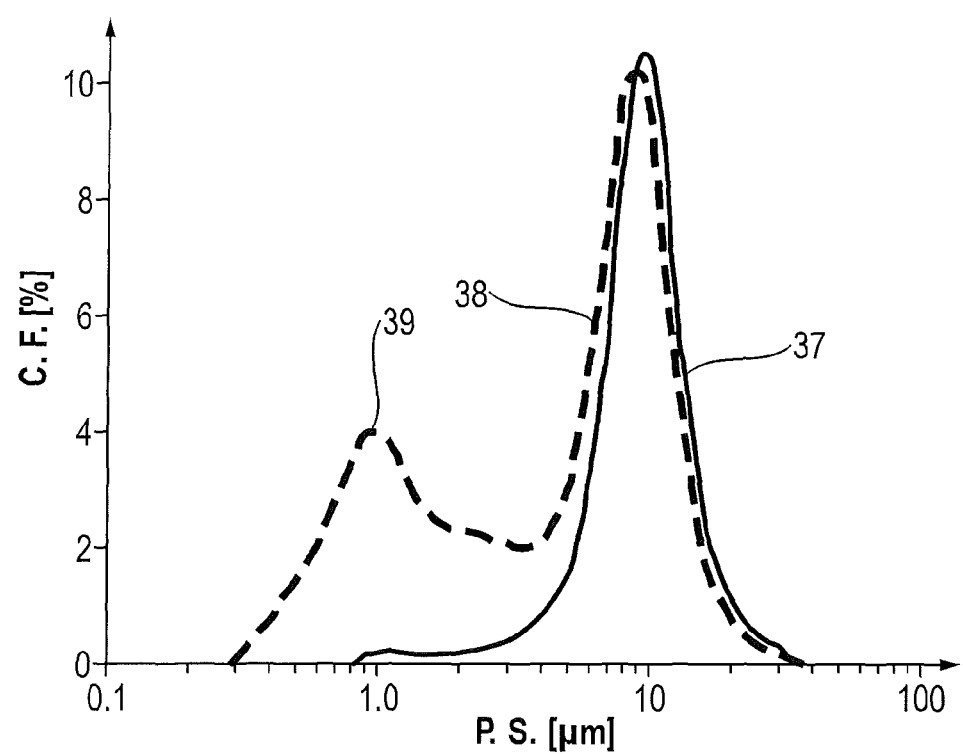
FIG. 5 shows a particle size distribution of the solid matter component in fresh and used slurry.

FIG. 5 shows the particle size distribution of the solids suspended in the slurry, this being for a fresh slurry (37) and for a slurry (38) that has been used in the cutting application, the counted particle component plotted in percent (count frequency, C.F.), relative to the total number of all particles counted in the sample, over the particle size (particle size, P.S.).

In the case of the fresh slurry, the solids in the slurry almost exclusively comprise only the hard substances that effect removal of material from the workpiece; in the case of the used slurry, the solids comprise mainly the hard substances, but additionally also abrasion debris from the workpiece material, abrasion debris from the wire and, to a small extent, abrasion debris from the mounting strip (carbon, plastic).

Noticeable in the case of the used slurry is the local maximum 39 of the particle size distribution 38 in the case of small particle sizes, in the region of 1 µm. This "fine particle" is the result of splintering off, and is mainly responsible for the diminishing material-removing effect of spent slurry.

The mean particle size for fresh and used slurry cannot be read off directly from FIG. 5, since FIG. 5 shows the number of counted particles per particle size class, whereas the mean particle size is calculated from the sum of the particle sizes, with weighting of the volume fraction occupied by the respective particle size (volumetric mean particle size). This latter size determines the width of the kerf, and is relevant for the third method according to the invention.

In an example for the third method, freshly prepared silicon carbide (SiC), as a material-removing hard substance having a particle size distribution similar to Fepa F-500 (curve 37 in FIG. 5) was suspended, in a 52.4% mass fraction of the finished slurry, in dipropylene glycol (DPG), as a carrier liquid, and a parting cut was effected to determine the kerf width on a 300 mm silicon rod. A wire having a diameter of 175 µm was used for the parting cut, the thickness of a wafer being determined at the end 12 of the rod on the wire infeed side and at the start of the cut by measurement along the section A-A' close to the point A (FIG. 1, center line thickness of the waver). For this wafer position in the rod, the wire diameter is known precisely (freshly supplied wire, 175 µm), and for the measurement position of the wafer thickness close to point A on the section A-A' the slurry is unused, and the mean size of the material-removing particle is known (start of cut).

By subtracting the measured thickness from the spacing of the grooves 2 (FIG. 1) at the rod end on the wire infeed side (1118 µm), a minimum kerf width of 218 µm, i.e. 218 µm-175 µm=43 µm was obtained for double the thickness of slurry film (namely, on both sides of the sawing wire). Thus, the slurry film in each case is approximately 1.4 times as wide as the mean particle size, which is 14.5 µm in the case of the F-500 particle that was used, and is approximately 1.5 times as wide as the median of the particle size distribution. Likewise, the kerf width was measured at the end of the cut, close to point A' on the center line thickness A-A' of the wafer. There, the slurry is spent, the measured particle size (volumetric mean from curve 38 in FIG. 5) is on average 9.73 µm, and the slurry film on both sides of the wire was found to be each approximately 13 µm, which corresponds only to approximately 1.3 times the mean particle size.

The reason for this is that, in contrast to the fresh slurry, the particle distribution of spent shiny is highly asymmetrical in relation to its maximum value, because of the greatly increased proportion of fine particles (39). The gain for the wafer thickness with the use of spent slurry, as compared with fresh slurry, is thus over 17 µm.

Normally, it is then out of the question at the present time to operate with used slurry, because spent slurry does result in uneven, scored and waved workpiece surfaces, such that, according to the prior art, cutting is performed with slurry that is as fresh as possible.

Investigations by the inventor have shown however, that these negative effects do not occur with impairing effect during the first millimeters of incision depth. The reasons for this are the fact that the transport of slurry into the kerf is still non-critical, obviously because of the small engagement length of the sawing wire, the small chip volume per unit of time of the rod infeed, and the small stripping action, because of the almost tangential wire entry.

For 300 mm rods, critical depths of cut, below which the disadvantageous effects of used slurries upon the quality of cut are not yet significant, and which are nevertheless sufficient to effect a perceptible reduction of the cut-in wedge, were found to be 6 mm for highly spent slurry, or supply of slurry having a mean particle size reduced by up to 60%, and approximately 15 mm for less highly spent slurry, or supply of slurry having a mean particle size reduced by up to 70%. These depths of cut correspond to 2% and 5%, respectively, of the maximum engagement length (300 mm).

The Fourth Method

The fourth method according to the invention for achieving thinner kerfs, and thus uniformly thicker wafers without an "cut-in wedge" is based on a temporary reduction of the slurry velocity during the incision.

The hydrodynamic back-pressure, determining the thickness of the slurry film around the wire, and the static pressure caused by the restoring force of the wire deflection can be reduced during the cut-in if the slurry is temporarily made runnier, i.e. if the viscosity is reduced.

For this purpose, in a first preferred embodiment of the fourth method according to the invention, a temporary thinning of the slurry (temporary increase in the proportion of carrier liquid in the slurry composed of carrier liquid and hard substances) is effected at the start of the sawing process, until a first incision depth (incision) is attained.

In a second preferred embodiment of the fourth method according to the invention, used slurry, which likewise has a lesser viscosity in comparison with unused slurry, is used for the incision of the wire grid into the workpiece.

Upon attainment of the first incision depth, at which the wire grid has penetrated the workpiece to a depth of a few millimeters, slurry having the standard (higher) viscosity is used.

Preferably, the incision depth is 2% or 5% of the greatest engagement length of a wire portion in the workpiece, wherein the greatest engagement length, in the case of a circular cylindrical body, corresponds to the diameter of the workpiece.

Preferably, the first viscosity is between 40 and 95% of the second viscosity.

Slurry having a lesser viscosity, i.e. a more runny slurry, produces a thinner slurry film, and thus a greater local wafer thickness. This effect superposes the effect of the reduced mean particle size in the spent slurry, which likewise results in a reduced film thickness.

Owing to the comparatively small quantity of the thinned slurry required during the short incision phase, of the slurry present in the supply for the saw, the composition of the slurry supply is scarcely altered.

Figure 4A:
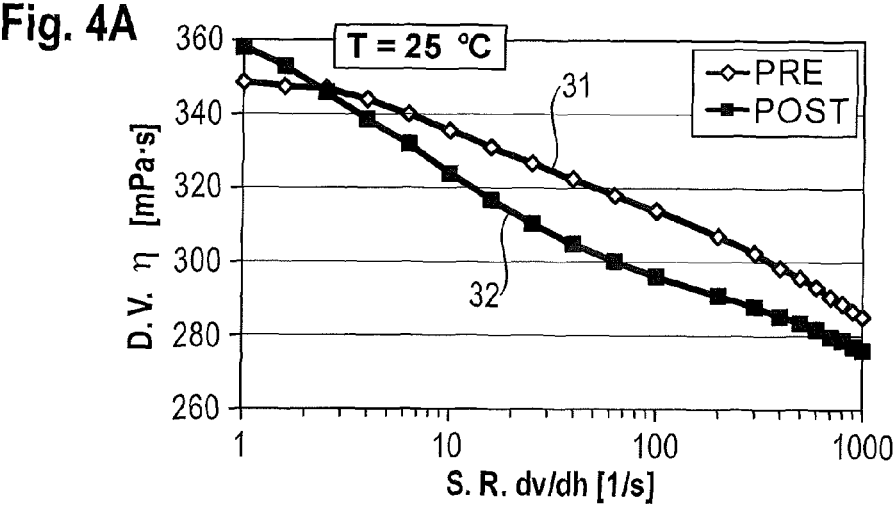
FIG. 4 shows the dynamic viscosity of fresh and used slurries as a function of the shear rate at 25° C. (A), 30° C. (B) and 60° C. (C).
Figure 4B:
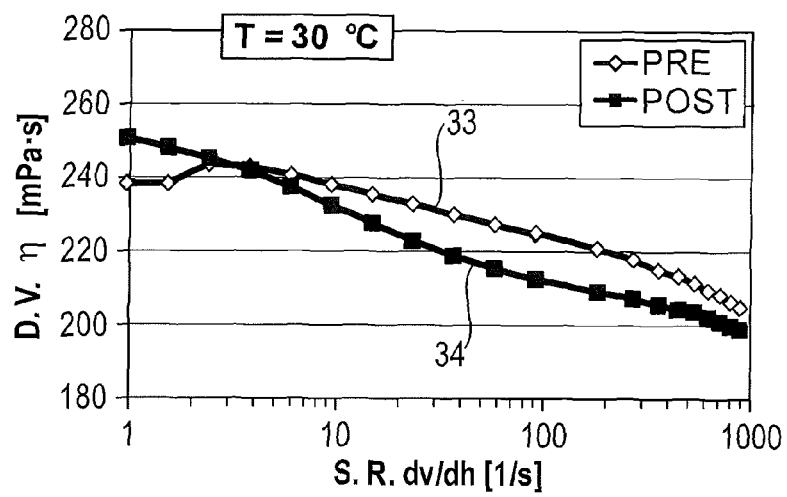
Figure 4C:
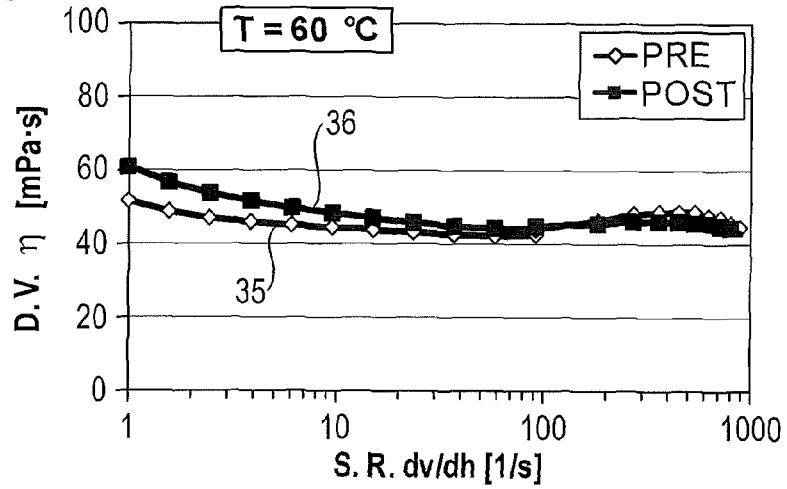

FIG. 4 shows the measured dynamic viscosity (D.V., symbol η) of fresh slurry (before the cut, "PRE", curves 31, 33 and 35) and used slurry (after the cut, "POST", curves 32, 34 and 36) of the slurry supply in the wire saw, as a function of the shear rate over the slurry film, measured in FIG. 4 (A) at 25° C., in FIG. 4 (B) at 30° C. and in FIG. 4 (C) at 60° C. A decrease in the viscosity of the used slurry, as compared with the fresh slurry, is clearly evident at 25° C. and at 30° C., although, owing to the additional proportion of abrasive debris from the wire and workpiece, the proportion of solids in the used slurry is always somewhat higher than that of the fresh slurry, which contains only the hard substances that effect removal of material.

The effect of the thinning is greatest precisely in the cut-in region, in which the engagement lengths l are short, and the viscous friction of the wire in the slurry against the workpiece material is low, and therefore the mean temperatures in the kerf are low.

In the case of long engagement lengths l, owing to the high friction in the long kerf, mean temperatures of up to just under 60° C. were determined by means of an infrared camera. At 60° C., fresh slurry does not differ in viscosity from used slurry.

Since the typical thicknesses h of slurry films are a few 10 μm and the velocity v of the wire motion in the longitudinal direction of the wire is some m/s for all examples, shear rates dv/dh are still obtained beyond the highest point of 1000/s accessible to measurement in the rheometer.

As a substitution, therefore, the viscosities at 1000/s are used. FIG. 4 (A) to (C) also shows that even a slight increase in the temperature of the slurry involves a considerable reduction in the viscosity. Thus, increases in the viscosity of the slurry supplied in the cut-in region, of 5 or 10° C., despite the strong cooling effect of the rod, which upon cut-in is at machine temperature, which greatly reduce the slurry temperature actually prevailing in the kerf, proved to be sufficient to effect a sufficient kerf reduction, and thus increase in wafer thickness, in the cut-in region, and thus sufficiently reduce the cut-in wedge.

In a third preferred embodiment of the fourth method, a reduction of the viscosity of the slurry is effected in that the slurry supplied to the wire grid and to the kerf at the instant of incision is heated briefly, and is cooled down again upon attainment of a first incision depth, when the wire thickness, owing to chip volume then present, can be selectively set by methods known in the prior art, for example alteration of the rod feed rate and alteration of first and second lengths of the pilgrim steps.

It is known that the viscosity of most liquids decreases as the temperature increases (Arrhenius-Andrade relationship). The prior art discloses only wire cut-off lapping methods in which the temperature of the supplied slurry is increased over the course of the cut, for example DE 11 2008 003 339 T5. However, a brief increase in temperature only at the instant of cut-in has been found to be harmless in respect of the other properties of the obtained wafers that are influenced by temperature. For example, a cut was performed during which the mean temperature of the slurry supplied over the cut was 25° C. This temperature was found to be advantageous, as it corresponded approximately to the ambient temperature and that of the machine frame, and thus resulted in only small thermal gradients over the various system components, with minimal relative thermal expansion of the components in relation to each other. By means of a flow thermostat, the slurry present in the supply for the cutting apparatus (150 l) was circulated through the slurry nozzles, via the wire grid and wire guide rollers, at a flow rate of 25 kg/min. The rod feed rate, averaged over the entire cut, was 0.4 mm/min, being up to 2 mm/min at the instant of incision, owing to the low chip volume. During the incision, the temperature was increased to 30° C. and to 35° C. for three to eight minutes. This corresponded to a cut-in depth of between six and 15 mm, during which the temperature increase was effective. Afterwards, slurry of a mean temperature of 25° C. was again supplied. Owing to the shortness of the time for which heated slurry was supplied, and the large thermal mass of the machine frame, feed device and rod, and the effective internal cooling of the wire guide rollers, there proved to be no negative effects caused by differing thermal expansions; however, owing to the reduction of the viscosity in the kerf, it was possible to reduce the thickness of the slurry film and increase the thickness of the wafers in the incision region, such that the cut-in wedge was no longer determinant of minimum thickness for the wafers obtained.

The fourth method is closely related to the third method; this is because the use of fine particles (used slurry) according to the third method, besides resulting in the tapering of the kerf because of smaller particles that keep the wire "at a distance" from the cutting face, also results in a change in the viscosity, and thus a reduction in distance, as is achieved directly in the fourth method by changing the viscosity of the slurry carrier liquid, for example by increasing the temperature.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCES AND ABBREVIATIONS 1 wire
2 groove
3 wire guide roller on wire infeed side
4 wire guide roller on wire run-out side
5 axis of the left wire guide roller
6 axis of the right wire guide roller
7 direction of rotation of the left wire guide roller
8 direction of rotation of the right wire guide roller
9 wire infeed
10 wire run-out
11 wire portion
12 (end face of the) wire infeed side of the rod
13 kerf
14 rod axis
15 semiconductor rod
16 breakthrough point of diametric cut lines A-A' and B-B' on cut start side
16' breakthrough point of diametric cut lines A-A' and B-B' on cut end side
17 wire entry side of kerf
18 wire exit side of kerf
19 slurry nozzle strip on wire infeed side
20 slurry nozzle strip on wire run-out side
21 slurry nozzles
22 slurry curtain on wire infeed side
23 slurry curtain on wire run-out side
24 (end face of the) wire run-out side of the rod
25 wire grid
26 identification groove (on cut-off wafer: identification notch)
27 decrease in thickness close to edge on wire entry side, in region of longest engagement length, along cut line D-D'
28 wedge-shaped decrease in thickness in sawing-in region ("cut-in wedge")
29 decrease in thickness close to edge on wire exit side, in region of longest engagement length, along cut line C-C'
30 center thickness along cut line A-A' and B-B'
31 dynamic viscosity of fresh slurries as a function of shear rate at 25° C.
32 dynamic viscosity of used slurries as a function of shear rate at 25° C.
33 dynamic viscosity of fresh slurries as a function of shear rate at 30° C.
34 dynamic viscosity of used slurries as a function of shear rate at 30° C.
35 dynamic viscosity of fresh slurries as a function of shear rate at 60° C.
36 dynamic viscosity of used fresh slurries as a function of shear rate at 60° C.
37 particle size distribution of fresh slurries
38 particle size distribution of used slurries
39 local maximum of particle size distribution of used slurries with small particle sizes
D local thickness in micrometers
z length in direction of feeding of workpiece on to the grid, in millimeters
D.V. dynamic viscosity in mPa·s (millipascal-seconds)
S.R. shear rate dv/dh (v=velocity, h=height in liquid film) in 1/s (s=second)
$\eta$ symbol for dynamic viscosity (Greek letter eta)
PRE before (fresh slurry)
POST after (used slurry)
C.F. particle count frequency, in percent
P.S. particle size, in micrometers ($\mu$m)

The invention claimed is:

1. A method for simultaneously cutting a multiplicity of slices from a cylindrical workpiece having a diameter, using, in the presence of a liquid cutting medium, a wire saw including a sawing wire, the sawing wire spanning a wire grid including a multiplicity of wire portions disposed parallelwise between rotatable wire guide rollers, the wire portions having a longitudinal tension and the wire portions defining a relative motion in relation to the workpiece as a result of rotation of the wire guide rollers with continual alternation between a first rotation direction and a second rotation direction, the second rotation direction being opposite to the first rotation direction, the method comprising:
moving the sawing wire by a first length during rotation in the first direction;
moving the sawing wire by a second length during rotation in the second direction, the second length being less than the first length;
at a first instant, applying a greater longitudinal wire portion tension than at a second instant,
wherein the first instant is at cut-in of the wire portions into the workpiece with a first cut depth,
wherein the second instant is at a second cut depth,
wherein the second instant is after the first instant, and
wherein the second instant is one at which an engagement length L of the wire portions in the workpiece is greater than 0.

2. The method of claim 1, wherein, at a cut depth of ≤2% of the diameter of the workpiece, the longitudinal tension is increased by ≤80% relative to a wire tension when the engagement length L of the wire portions is equal to the diameter of the workpiece.

3. The method of claim 1, wherein, at a cut depth of ≤5% of the diameter of the workpiece, the longitudinal tension is increased by ≤50% relative to a wire tension when the engagement length L of the wire portions is equal to the diameter of the workpiece.

4. The method of claim 1, wherein the first cut depth is between 0 and 5% of a greatest engagement length of a wire portion in the workpiece.

5. The method of claim 1, wherein a first wire tension, at the first instant, is between 1.2 times and 1.8 times a second wire tension, at the second instant.

6. A method for simultaneously cutting a multiplicity of slices from a cylindrical workpiece having a diameter, using, in the presence of a liquid cutting medium, a wire saw including a sawing wire, the sawing wire spanning a wire grid including a multiplicity of wire portions disposed parallelwise between two rotatable wire guide rollers, the wire portions having a longitudinal tension and the wire portions defining a relative motion in relation to the workpiece as a result of rotation of the wire guide rollers with continual alternation between a first rotation direction and a second rotation direction, the second rotation direction being opposite to the first rotation direction, the method comprising:

during rotation between each pair of directly successive reversal of direction in the first rotation direction, in each case, moving the sawing wire, with a first velocity, and, by a first length;

during rotation in the second rotation direction, in each case, moving the saw wire with a second velocity, and by a second length, the second length being shorter that the first length, at a cutting operation start, selecting a first mean velocity of the sawing wire between two successive changes of direction, the first mean velocity being formed from the first velocity and the second velocity; and at the end of the cutting operation, selecting a second mean velocity of the sawing wire between two successive changes of direction, the second mean velocity being formed from the first velocity and the second velocity, wherein the first mean velocity is less than the second mean velocity.

7. The method of claim 6, wherein the first length or the second length changes with an incision depth of the kerfs.

8. The method of claim 6, wherein, between a first contact of the wire grid with the workpiece and up to a first cut depth, wire motion is effected with the first mean velocity, and wherein, following attainment of the first cut depth, up to an end of the cutting operation, the wire motion is effected with the second mean velocity.

9. The method of claim 6, wherein the second mean velocity is between 6 and 20 m/s.

10. The method of claim 8, wherein the first cut depth is between 0 and 2% of a greatest engagement length of a wire portion in the workpiece.

11. The method of claim 8, wherein the first cut depth is between 0 and 5% of a greatest engagement length of a wire portion in the workpiece.

12. The method of claim 6, wherein the first mean velocity is between 10 and 90% of the second mean velocity.

13. The method of claim 6, wherein the first mean velocity is between 40 and 80% of the second mean velocity.

14. A method for simultaneously cutting a multiplicity of slices from a cylindrical workpiece having a diameter, using, in the presence of a liquid cutting medium, a wire saw including a sawing wire, the sawing wire spanning a wire grid including a multiplicity of wire portions disposed parallelwise between two rotatable wire guide rollers, the wire portions having a longitudinal tension and the wire portions defining a relative motion in relation to the workpiece as a result of rotation of the wire guide rollers with continual alternation between a first rotation direction and a second rotation direction, second rotation direction being opposite to the first rotation direction, the method comprising:

moving the sawing wire by a first length during rotation in the first rotation direction;

moving the sawing wire by a second length during rotation in the second rotation direction, the second length being less than the first length;

from a start of the cutting operation until the attainment of a first cut depth, supplying hard substances to a cutting unit with a first mean particle diameter; and after attainment of the first cut depth, until an end of the cutting operation, supplying further hard substances to the cutting unit having a second mean particle diameter, wherein the first mean particle diameter is less than the second mean particle diameter.

15. The method of claim 14, wherein the first cut depth is 2% of a greatest engagement length of a wire portion in the workpiece.

16. The method of claim 14, wherein the first cut depth is 5% of a greatest engagement length of a wire portion in the workpiece.

17. The method of claim 14, wherein the first particle diameter is between 50 and 80% of the second particle diameter.

18. The method of claim 1, wherein the sawing wire is a monofilament steel wire, having a first diameter, wherein the sawing wire, as a result of plastic deformation in a transverse direction of the sawing wire, includes a multiplicity of protuberances and indentations, in the form of a zigzag, wherein an envelope curve of the multiplicity, in a plane perpendicular to a longitudinal direction of the wire, has a second diameter, wherein the second diameter is greater than the first diameter.

19. The method of claim 2, wherein the first cut depth is between 0 and 5% of a greatest engagement length of a wire portion in the workpiece.

20. The method of claim 3, wherein the first cut depth is between 0 and 5% of a greatest engagement length of a wire portion in the workpiece.

21. The method of claim 2, wherein a first wire tension, at the first instant, is between 1.2 times and 1.8 times a second wire tension, at the second instant.

22. The method of claim 3, wherein a first wire tension, at the first instant, is between 1.2 times and 1.8 times a second wire tension, at the second instant.

23. The method of claim 4, wherein a first wire tension, at the first instant, is between 1.2 times and 1.8 times a second wire tension, at the second instant.

24. The method of claim 7, wherein, between a first contact of the wire grid with the workpiece and up to a first cut depth, wire motion is effected with the first mean velocity, and wherein, following attainment of the first cut depth, up to an end of the cutting operation, the wire motion is effected with the second mean velocity.

25. The method of claim 7, wherein the second mean velocity is between 6 and 20 m/s.

26. The method of claim 8, wherein the second mean velocity is between 6 and 20 m/s.

27. The method of claim 9, wherein the first cut depth is between 0 and 2% of a greatest engagement length of a wire portion in the workpiece.

28. The method of claim 9, wherein the first cut depth is between 0 and 5% of a greatest engagement length of a wire portion in the workpiece.

29. The method of claim 7, wherein the first mean velocity is between 10 and 90% of the second mean velocity.

* * * * *